T. C. LUCE.
CHAIN TOOL.
APPLICATION FILED MAR. 25, 1915.
1,141,877.
Patented June 1, 1915.
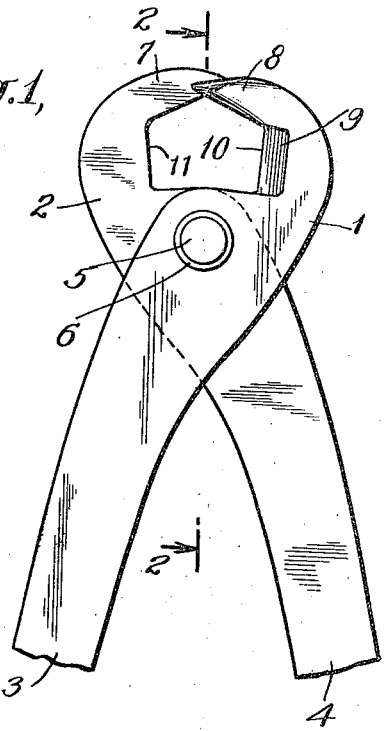
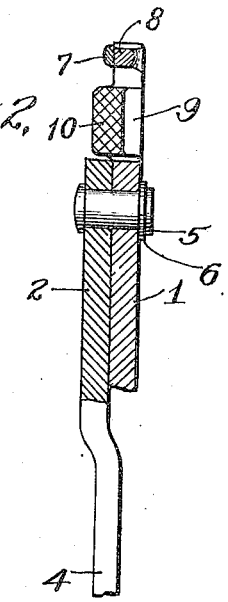
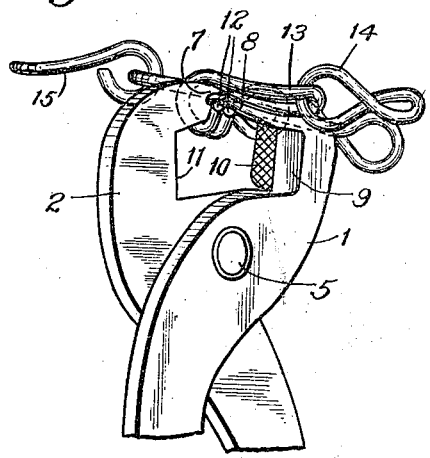
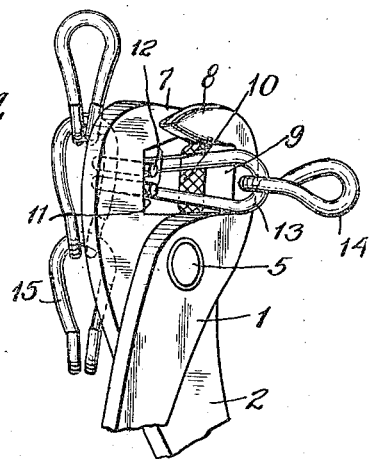
WITNESSES
Jessie B. Kay
Charles Eberhart
INVENTOR
Thomas C. Luce
BY
Harry L. Duncan ATTORNEY

UNITED STATES PATENT OFFICE.

THOMAS C. LUCE, OF STRATFORD, CONNECTICUT, ASSIGNOR TO AMERICAN CHAIN COMPANY, INCORPORATED, OF BRIDGEPORT, CONNECTICUT, A CORPORATION OF NEW YORK.

CHAIN-TOOL.

1,141,877.

Specification of Letters Patent. Patented June 1, 1915.

Application filed March 25, 1915. Serial No. 16,843.

*To all whom it may concern:*

Be it known that I, THOMAS C. LUCE, a citizen of the United States, and resident of Stratford, Fairfield county, State of Connecticut, have made a certain new and useful Invention Relating to Chain-Tools, of which the following is a specification, taken in connection with the accompanying drawing, which forms part of the same.

This invention relates especially to tools for the construction or repair of chain tire grips, although of course adapted for use in connection with other chain or wire devices where it is desirable to open and close links or the like.

In the accompanying drawings showing in a somewhat diagrammatic way an illustrative embodiment of this invention, Figure 1 is an elevation of the tool in its substantially open position. Fig. 2 is a transverse section taken substantially along the line 2—2 of Fig. 1. Fig. 3 is a perspective view showing the tool acting as a hook opener; and Fig. 4 shows its action in closing a tread chain attaching hook.

As shown in the illustrative embodiment of the invention which is indicated in the drawing the tool may comprise two closing jaws 1, 2 which may have operating handles of any desired description, such as the integral handles 3, 4, each jaw and connected handle being preferably formed of sheet steel of substantially uniform thickness and practically flat throughout, except that if desired parts of the handle may be bent inward so as to engage the other handle and positively prevent undesirable inward movement. In this way the parts of the tool may at a minimum of expense be very readily stamped out of sheets of tool steel or any other suitable material, the jaws being preferably given ample area adjacent their pivotal portions so as to secure in this way the desired degree of alinement without any specially accurate fitting. The pivot connection of the jaws may be conveniently secured by an ordinary pivot or bolt 5 preferably having a washer 6 and serving to hold the jaws in substantial alinement under operating conditions. The jaws may be provided with suitable coöperating opening and closing devices adapted to open the attaching hooks of chain grips of the Weed-Parsons type, for instance, and to close the attaching hooks down on the side chains so as to secure the tread members in position. The opening device preferably comprises lapping wedging opening jaws having a scissors action so that their lapping points have meeting faces which are in the same plane and can thus wedge between the portions of the attaching hook and open the same. It is of advantage in this connection to have at least one wedging opening jaw, such as 8, in which the point of the jaw has considerable height in a direction perpendicular to the meeting faces of these wedging portions while the extreme points of this wedging jaw is quite narrow as indicated in Fig. 1 and gradually widens or flares away from the point so as to engage to best advantage the bent ends of these attaching hooks and wedge them away from the shanks of the hooks. Under these circumstances, the coöperating jaw may have a distinctively alining action and can with advantage be given more of a duck bill form so as to have a lower and wider point as indicated in Fig. 2 and more rapidly increase in height as it flares away from the point of this jaw. As indicated in Fig. 3 the points of these opening jaws are inserted in one of these attaching hooks 13 so that the alining jaw 7 coöperates with the double loop portion of the attaching hook and rests on one of the links 15 of the side chain while the comparatively sharp or narrow point of the wedging jaw 8 enters between the bent ends 12 of the attaching hook and its shank, so that the forcible closure of the jaws by means of the lever handles which may be given any desired length readily wedges open the hook which assumes the somewhat inclined position indicated in Fig. 3, its attaching end connected to the cross chain 14 being turned somewhat toward the socket 10. The closing device for closing these attaching hooks and thus securing the connected tread chains 14 to one of the side chains 15 of the grip may with advantage comprise a pair of gripping sockets, such as 11, whose outer sides may consist of the inner faces of the wedging opening jaws so that in operation these faces of the opening jaws act as wedging retainers, forcing laterally into alinement any part of the hook which tends to get out of alinement while the hook is being forced together in the other direction during the closed operation. It is also desirable in this connection to form one of these closing sockets with an offset gripping portion 10 as by stamping out the adjacent recess 9 so that this gripping portion is considerably offset from the other adjacent portions of this jaw and provide a corresponding space in which the link of the side chain may lie during the closing operation. In this way this offset gripping socket is not only brought into substantial alinement with the gripping socket 11 on the other jaw 2, but also makes it possible to engage the attaching hook nearer its bent portion during the closing operation. These hooks 13 first have their bent ends 12 inserted through one of the links 15 of the side chain and then the hook is inserted in these gripping sockets as indicated in Fig. 4 and the jaws brought forcibly together so as to force the bent ends 12 of the hook into substantial contact with its shank, the hook being, if desired, moved farther into the socket during this operation so as to force the parts entirely home, the wedging retainers meanwhile preventing any possible loss of lateral alinement of the parts.

This invention has been described in connection with a number of illustrative embodiments, forms, proportions, sizes and materials, and arrangements of parts, to the details of which disclosure the invention is not of course to be limited, since

What is claimed as new and what is desired to be secured by Letters Patent is set forth in the appended claims.

1. In chain tools adapted for use in opening or closing chain tire grips and so forth, substantially flat closing jaws each having an integral handle and of substantially the same thickness throughout its entire extent, a pivot connecting said jaws and holding their coöperating faces in substantial alinement under operating conditions, said jaws having gripping sockets, one of which is offset so as to be in substantial alinement with the gripping socket of the other jaw and project considerably out of the plane of the jaw in which it is formed, lapping opening jaws extending toward each other beyond said sockets and having substantially flat meeting faces and inclined edges to form lapping points, one of said opening jaws having a narrow point of relatively great height perpendicular to said meeting faces and having gradually increasing width as it extends away from said point to form a wedging opening jaw and the coöperating opening jaw having a substantially duck bill flat point and having gradually increasing height away from said meeting faces as it extends away from its point to have an alining action upon the doubled loop portion of an attaching hook.

2. In chain tools adapted for use in opening or closing chain tire grips and so forth, substantially flat closing jaws each having a handle, a pivot connecting said jaws and holding their coöperating faces in substantial alinement under operating conditions, said jaws having gripping sockets, one of which is offset so as to be in substantial alinement with the gripping socket of the other jaw and project considerably out of the plane of the jaw in which it is formed, lapping opening jaws extending toward each other beyond said sockets to act as wedging lateral retainers therefor and having substantially flat meeting faces and inclined edges to form lapping points, one of said opening jaws having a narrow point of relatively great height perpendicular to said meeting faces and having gradually increasing width as it extends away from said point to form a wedging opening jaw and the coöperating opening jaw having a substantially flat point and having gradually increasing height away from said meeting faces as it extends away from its point to have an alining action upon the double loop portion of an attaching hook.

3. In chain tools adapted for use in opening or closing chain tire grips and so forth, substantially flat pivot portions each having an integral handle and of substantially the same thickness throughout its entire extent, a pivot connecting said pivot portions and holding their coöperating faces in substantial alinement under operating conditions, said pivot portions being formed with lapping opening jaws extending toward each other and having substantially flat meeting faces substantially in the plane of the coöperating faces of said pivot portions and inclined edges to form lapping points, one of said opening jaws having a narrow point of relatively great height perpendicular to said meeting faces and having gradually increasing width as it extends away from said point to form a wedging opening jaw and the coöperating opening jaw having a substantially duck bill flat point and having gradually increasing height away from said meeting faces as it extends away from its point to have an alining action upon the double loop portion of an attaching hook.

4. In chain tools adapted for use in opening or closing chain tire grips and so forth, substantially flat pivot portions each having a handle, a pivot connecting said pivot portions and holding their coöperating faces in substantial alinement under operating conditions, said pivot portions being formed with lapping opening jaws extending toward each other and having substantially flat meeting faces and inclined edges to form lapping points, one of said opening jaws having a narrow point of relatively great height perpendicular to said meeting faces and having increasing width as it extends away from said point to form a wedging opening jaw and the coöperating opening jaw having a substantially flat point and having increasing height away from said meeting faces as it extends away from its point to have an alining action upon the double loop portion of an attaching hook.

5. In chain tools adapted for use in opening or closing chain tire grips and so forth, lapping opening jaws extending toward each other and having substantially flat meeting faces and inclined edges to form lapping points, one of said opening jaws having a narrow point of relatively great height perpendicular to said meeting faces and having gradually increasing width as it extends away from said point to form a wedging opening jaw and the coöperating opening jaw having a substantially duck bill flat point and having gradually increasing height away from said meeting faces as it extends away from its point and adapted to have an alining action upon the double loop portion of an attaching hook and operating handles connected to said jaws.

6. In chain tools adapted for use in opening or closing chain tire grips and so forth, lapping opening jaws extending toward each other and having substantially flat meeting faces, one of said opening jaws having a narrow point of relatively great height perpendicular to said meeting faces and having increasing width as it extends away from said point to form a wedging opening jaw and the coöperating opening jaw having a point and having gradually increasing height away from said meeting faces as it extends away from its point and adapted to have an alining action upon the double loop portion of an attaching hook and operating handles connected to said jaws.

THOMAS C. LUCE.

Witnesses:
WALTER B. LASHAR,
WM. C. ETTERSHANK.